US010746434B2

(12) United States Patent
Kawai et al.

(10) Patent No.: US 10,746,434 B2
(45) Date of Patent: Aug. 18, 2020

(54) HOUSING COVER AND INDOOR UNIT OF AIR CONDITIONING APPARATUS HAVING THE HOUSING COVER

(71) Applicant: Mitsubishi Electric Corporation, Tokyo (JP)

(72) Inventors: Shinji Kawai, Tokyo (JP); Masayuki Oishi, Tokyo (JP); Shuhei Yokota, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 252 days.

(21) Appl. No.: 15/569,884

(22) PCT Filed: Jul. 30, 2015

(86) PCT No.: PCT/JP2015/071696
§ 371 (c)(1),
(2) Date: Oct. 27, 2017

(87) PCT Pub. No.: WO2017/017848
PCT Pub. Date: Feb. 2, 2017

(65) Prior Publication Data
US 2018/0119985 A1 May 3, 2018

(51) Int. Cl.
F24F 13/20 (2006.01)
F24F 11/89 (2018.01)
(Continued)

(52) U.S. Cl.
CPC ............ F24F 13/20 (2013.01); F24F 1/0007 (2013.01); F24F 11/56 (2018.01); F24F 11/89 (2018.01);
(Continued)

(58) Field of Classification Search
CPC .......... F24F 13/20; F24F 11/56; F24F 1/0007; F24F 11/89; F24F 2110/10; F24F 11/00; G01J 5/0003; G01J 5/0205; G01J 5/00
(Continued)

(56) References Cited

U.S. PATENT DOCUMENTS 4,758,688 A * 7/1988 Aschberger ............. F16L 41/08
174/153 G
2008/0074824 A1* 3/2008 Furuhashi ................. A61L 9/22
361/231

FOREIGN PATENT DOCUMENTS

EP 2 031 316 A2 3/2009
JP 04129032 U 11/1992
(Continued)

OTHER PUBLICATIONS

Office Action dated Jul. 29, 2019 issued in corresponding CN patent application No. 201580081872.8 (and English translation).
(Continued)

Primary Examiner — Lisa M Caputo
Assistant Examiner — Janice M Soto
(74) Attorney, Agent, or Firm — Posz Law Group, PLC

(57) ABSTRACT

A housing cover provided on a housing section of an indoor unit of an air conditioning apparatus, the indoor unit including a casing, and the housing section provided on a bottom portion of the casing and having a remote control receiving section for receiving an infrared signal from a remote control and a temperature detection sensor for contactlessly detecting a surface temperature of an object in a room, the housing cover comprising a light transmissive surface inclined diagonally downward from a front and a sensor opening port formed behind the light transmissive surface, wherein the light transmissive surface is formed in front of the remote control receiving section to be opposed to and be parallel to the remote control receiving section, and the
(Continued)

sensor opening port is formed such that the temperature detection sensor protrudes from the opening port.

6 Claims, 9 Drawing Sheets

(51) Int. Cl.
    *F24F 11/56*     (2018.01)
    *F24F 1/0007*     (2019.01)
    *G01J 5/00*     (2006.01)
    *G01J 5/02*     (2006.01)
    *F24F 110/10*     (2018.01)

(52) U.S. Cl.
    CPC ........... *G01J 5/0003* (2013.01); *G01J 5/0205* (2013.01); *F24F 2110/10* (2018.01)

(58) Field of Classification Search
    USPC .......................................................... 374/208
    See application file for complete search history.

(56) References Cited

FOREIGN PATENT DOCUMENTS

| | | |
|---|---|---|
| JP | 08178348 A | 7/1996 |
| JP | 2009-079825 A | 4/2009 |
| JP | 2010-210200 A | 9/2010 |
| JP | 2011-017490 A | 1/2011 |
| JP | 2012-149846 A | 8/2012 |
| JP | 2014-016130 A | 1/2014 |

OTHER PUBLICATIONS

International Search Report of the International Searching Authority dated Oct. 20, 2015 for the corresponding international application No. PCT/JP2015/071696 (and English translation).

Extended EP Search Report dated Feb. 15, 2019 issued in corresponding EP patent application No. 15899681.9.

Office Action dated Mar. 12, 2020 issued in corresponding CN patent application No. 201580081872.8 (and English translation).

* cited by examiner (a)

(b)

(a)

(b)

HOUSING COVER AND INDOOR UNIT OF AIR CONDITIONING APPARATUS HAVING THE HOUSING COVER

CROSS REFERENCE TO RELATED APPLICATION

This application is a U.S. national stage application of International Application No. PCT/JP2015/071696, filed on Jul. 30, 2015, the contents of which are incorporated herein by reference.

TECHNICAL FIELD

The present invention relates to a housing cover for a housing of a remote control receiving section of an indoor unit of an air conditioning apparatus, and to an indoor unit of an air conditioning apparatus having the housing cover.

BACKGROUND

Conventionally, there have been indoor units of air conditioning apparatuses in which the indoor units include a light transmissive surface provided on a portion of a casing and inclined diagonally downward from the front and a light receiving section arranged behind the light transmissive surface being opposed to and parallel to the light transmissive surface to improve reception performance of a remote control (see, for example, Patent Literature 1).

There have also been indoor units of air conditioning apparatuses in which the indoor units have a temperature detection sensor for contactlessly sensing the surface temperature of an object in a room (see, for example, Patent Literature 2).

PATENT LITERATURE

Patent Literature 1: Japanese Unexamined Patent Application Publication No. 2011-17490
Patent Literature 2: Japanese Unexamined Patent Application Publication No. 2010-210200

In Patent Literature 1, the casing is cut out diagonally at a corner on the front and bottom side thereof to form the light transmissive surface. However, the recent trend toward square-shaped casings for improved design has made it necessary to improve reception performance of remote controls for square-shaped casings. In Patent Literature 2, the temperature detection sensor protrudes from a casing, impairing design.

SUMMARY

The present invention has been made to overcome the foregoing problems and an object of the present invention is to provide a housing cover of an indoor unit of an air conditioning apparatus having a structure in which a temperature detection sensor protrudes from a casing, the housing cover being capable of improving design, and an indoor unit of an air conditioning apparatus having the housing cover.

A housing cover of an embodiment of the present invention is housing cover of an indoor unit of an air conditioning apparatus, the indoor unit including a casing, and a housing section provided on a bottom portion of the casing, the housing section including a remote control receiving section configured to receive an infrared signal from a remote control, and a temperature detection sensor configured to contactlessly detect a surface temperature of an object in a room, the housing cover being provided on the housing section and comprising: a light transmissive surface inclined diagonally downward from a front; and a sensor opening port formed behind the light transmissive surface, the light transmissive surface being formed in front of the remote control receiving section to be opposed to and be parallel to the remote control receiving section, the sensor opening port being formed such that the temperature detection sensor protrudes from the opening port The housing cover of the embodiment of the present invention is capable of providing improved design by being used for the indoor unit of the air conditioning apparatus having a structure in which the temperature detection sensor protrudes from the casing.

DETAILED DESCRIPTION

Figure 1:
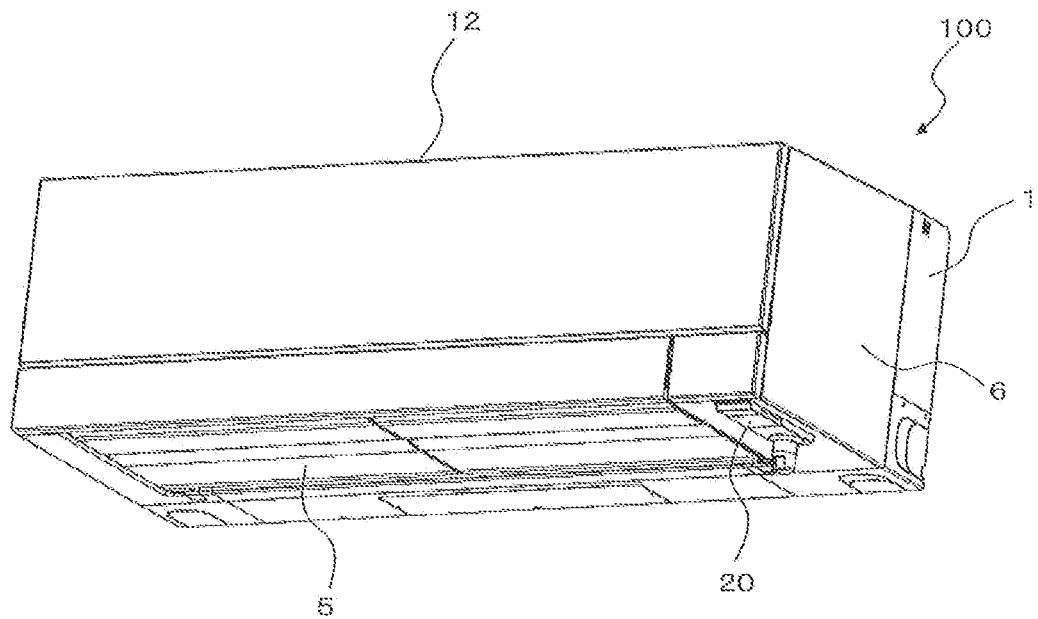
FIG. 1 is an external perspective view, as viewed from the front, of an indoor unit of an air conditioning apparatus according to an embodiment of the present invention.

An embodiment of the present invention will be described hereinafter with reference to the drawings. It should be noted that the present invention is not limited to the embodiment described below. Additionally, in the drawings below, the size relationships of the structural members may be different from actual ones.

Embodiment

Figure 2:
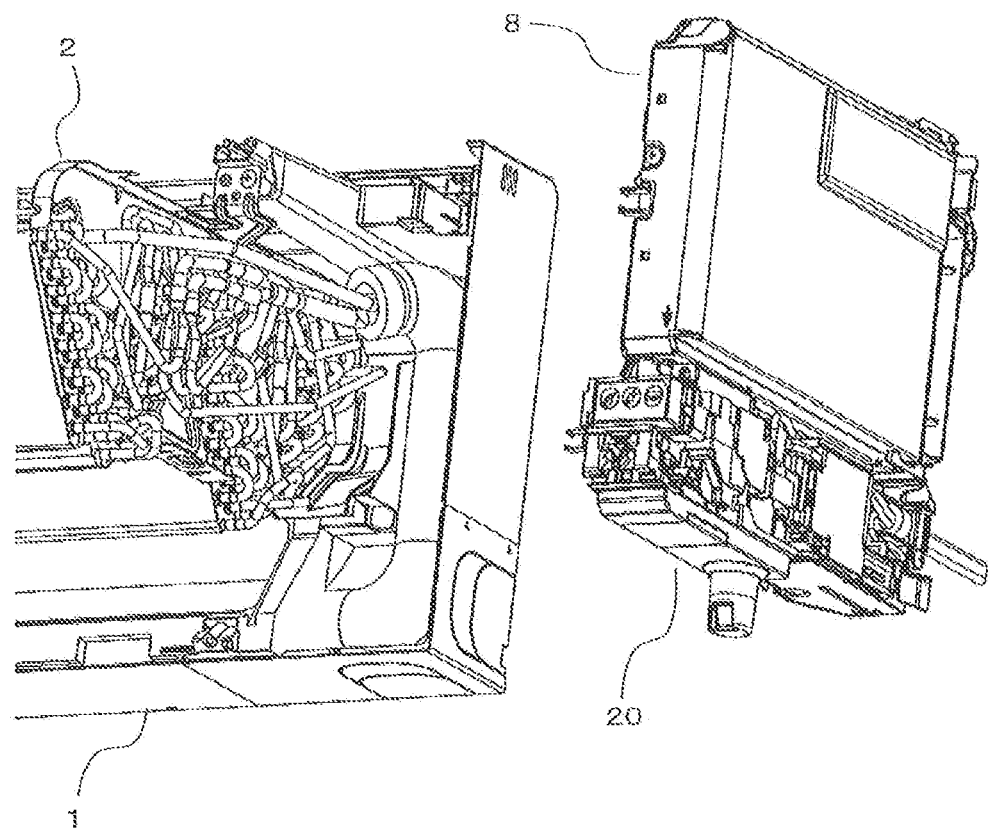
FIG. 2 is an exploded perspective view of the housing section of FIG. 1 and its surroundings.
Figure 3:
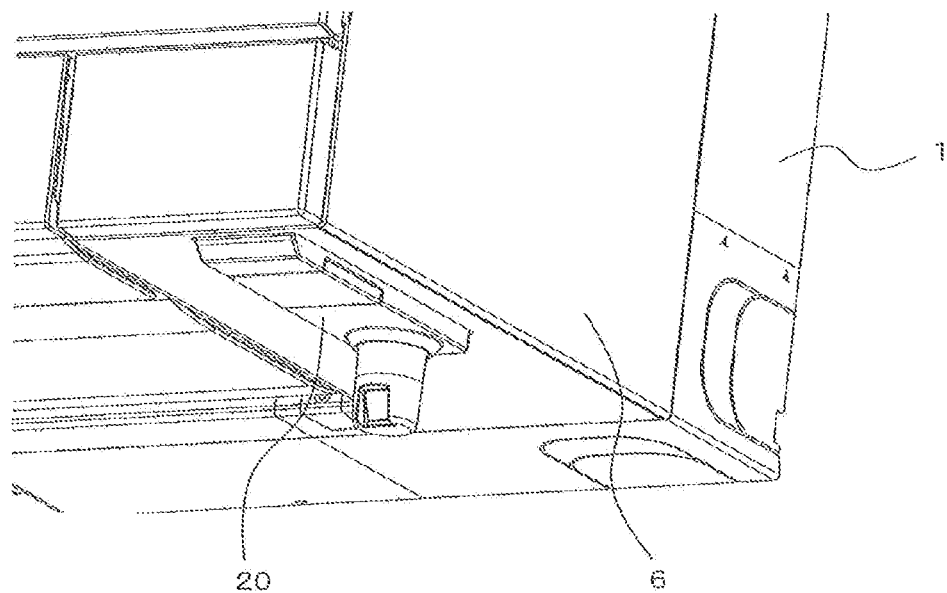
FIG. 3 is an enlarged external perspective view of a housing section of FIG. 1 and its surroundings.

FIG. 1 is an external perspective view of an indoor unit 100 of an air conditioning apparatus according to an embodiment of the present invention, as viewed from the front. FIG. 2 is an enlarged external perspective view of a housing section 20 of FIG. 1 and its surroundings, and FIG. 3 is an exploded perspective view of the housing section 20 of FIG. 1 and its surroundings.

In the description below, directional terms (for example, "top", "bottom", "right", "left", "front", and "back") are used as appropriate for ease of understanding, but they are intended to be illustrative only and not to limit the present invention. "Top", "bottom", "right", "left", "front", and "back" are used for the indoor unit 100 as seen from the front.

A configuration of the indoor unit 100 will be described with reference to FIGS. 1 to 3.

The indoor unit 100 according to the present embodiment supplies conditioned air to an air-conditioning target space such as inside a room by utilizing a refrigeration cycle that circulates refrigerant. It should be noted that the present embodiment is an example where the indoor unit 100 is a wall-mount type to be attached to a wall of the air-conditioning target space.

As shown in FIG. 1, the indoor unit 100 includes a rear case 1 to be attached to a wall and a rectangular casing 6 that is attached to the front of the rear case 1. The casing 6 has an air inlet 12 opening on a top portion thereof for mainly drawing room air therein. The casing 6 has an air outlet 5 opened on a front bottom portion thereof for supplying the conditioned air to the air-conditioning target space, and the air outlet 5 is provided with an up-down wind direction louver (not shown) that controls an outlet direction of air flow.

As shown in FIG. 2, the casing 6 houses a fan (not shown) that draws in the room air from the air inlet 12 and blows out the conditioned air from the air outlet 5, a heat exchanger 2 that is arranged on an air channel between the air inlet 12 and the air outlet 5 and exchanges heat between the refrigerant and the room air to produce the conditioned air, and an electrical component box 8 that is arranged on a side of the heat exchanger 2 and contains, for example, a control board (not shown) for controlling operation of the indoor unit 100.

The electrical component box 8 is provided, on a bottom portion thereof, with the housing section 20 that is composed, for example, of a remote control receiving section 21 (see, FIG. 5 described below), and as shown in FIGS. 1 and 2, the housing section 20 is arranged on a bottom portion of the casing 6. As shown in FIGS. 1 and 2, the air outlet 5 is formed below the heat exchanger 2 and the housing section 20 is arranged on a side of the air outlet 5. This is to prevent sensors provided in the housing section 20 from being affected by the conditioned air.

Air flow inside the indoor unit 100 will now be briefly described.

The room air flows into the indoor unit 100 from the air inlet 12 formed on the top portion of the casing 6 by the fan not shown. Dust in the air is removed at this point by a filter not shown. This room air is heated or cooled by the refrigerant conducting inside the heat exchanger 2 when passing through the heat exchanger 2 and is turned into the conditioned air. The conditioned air is then blown outside the indoor unit 100, that is, into the air-conditioning target space from the air outlet 5 formed on the front bottom portion of the casing 6.

Figure 4:
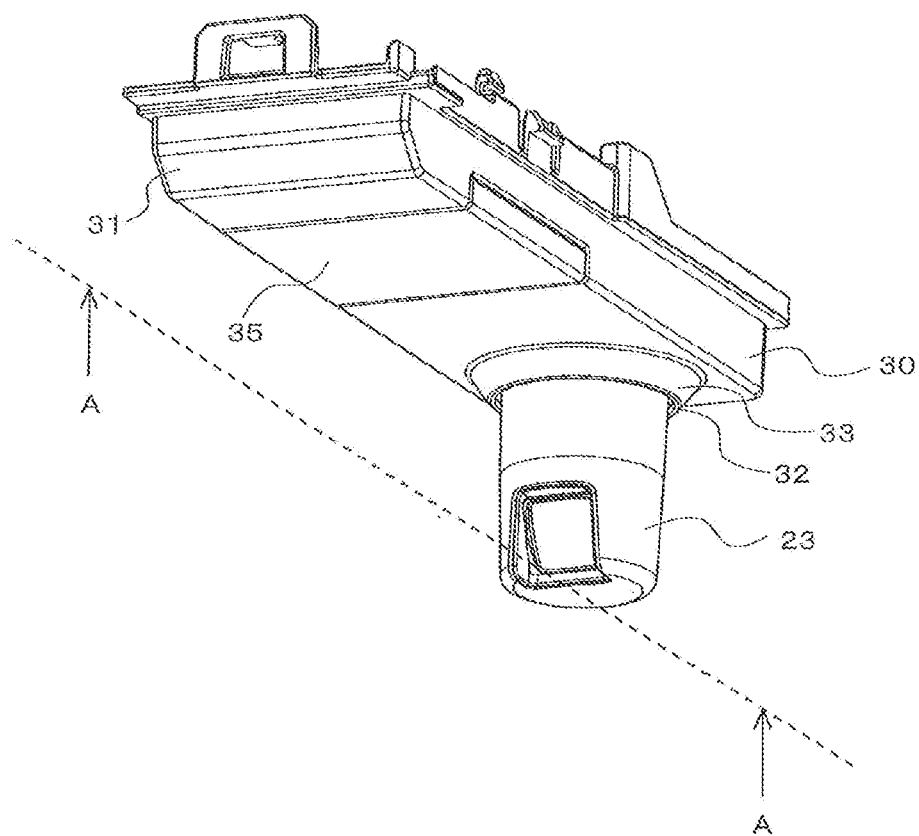
FIG. 4 is a perspective view of the housing section of the indoor unit of the air conditioning apparatus according to the embodiment of the present invention.
Figure 5:
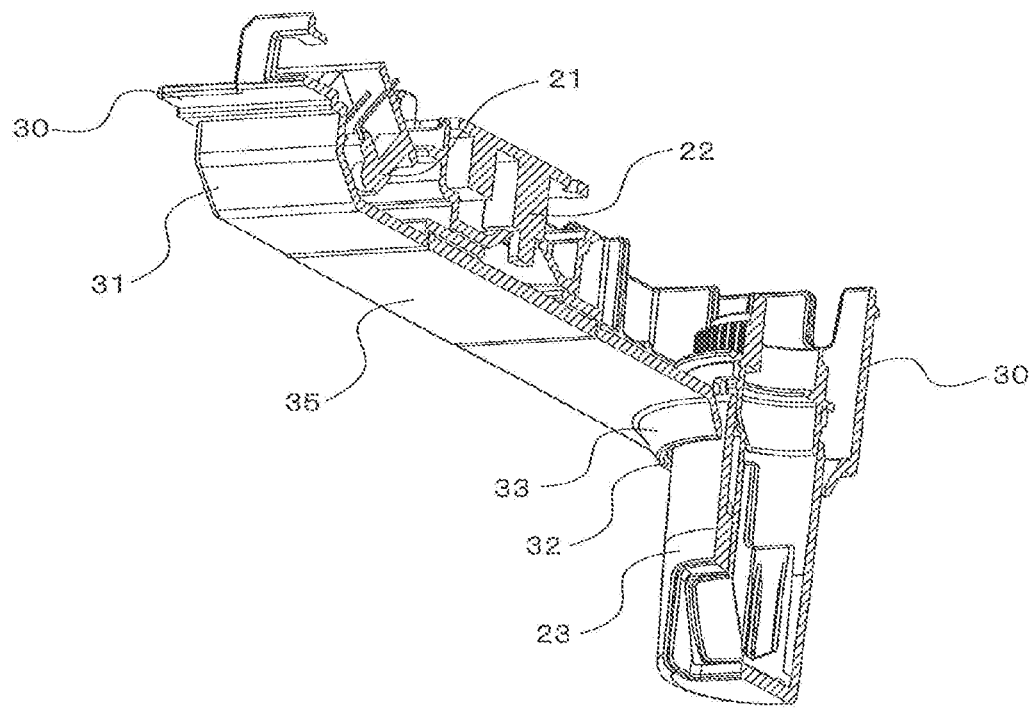
FIG. 5 is a cross-sectional view taken along line A-A of FIG. 4.
Figure 6:
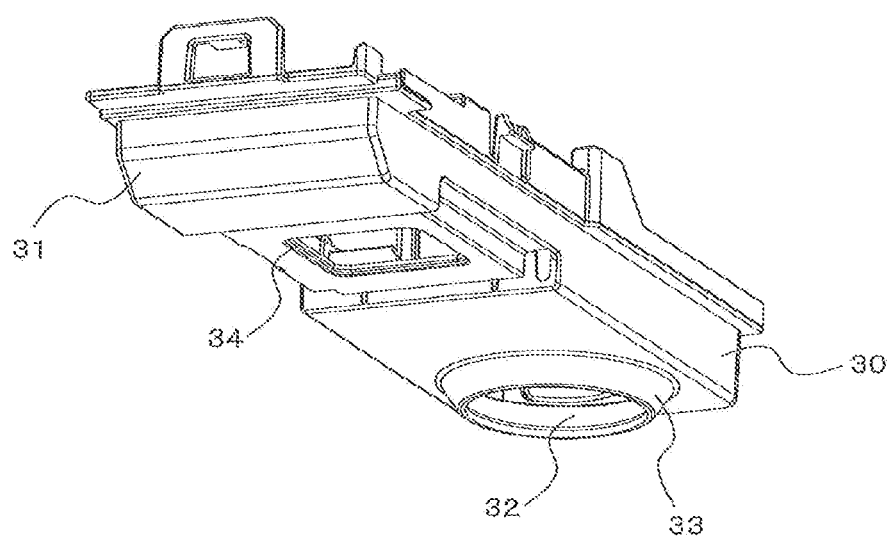
FIG. 6 is a perspective view of a housing cover according to the embodiment of the present invention with an openable lid removed.
Figure 7:
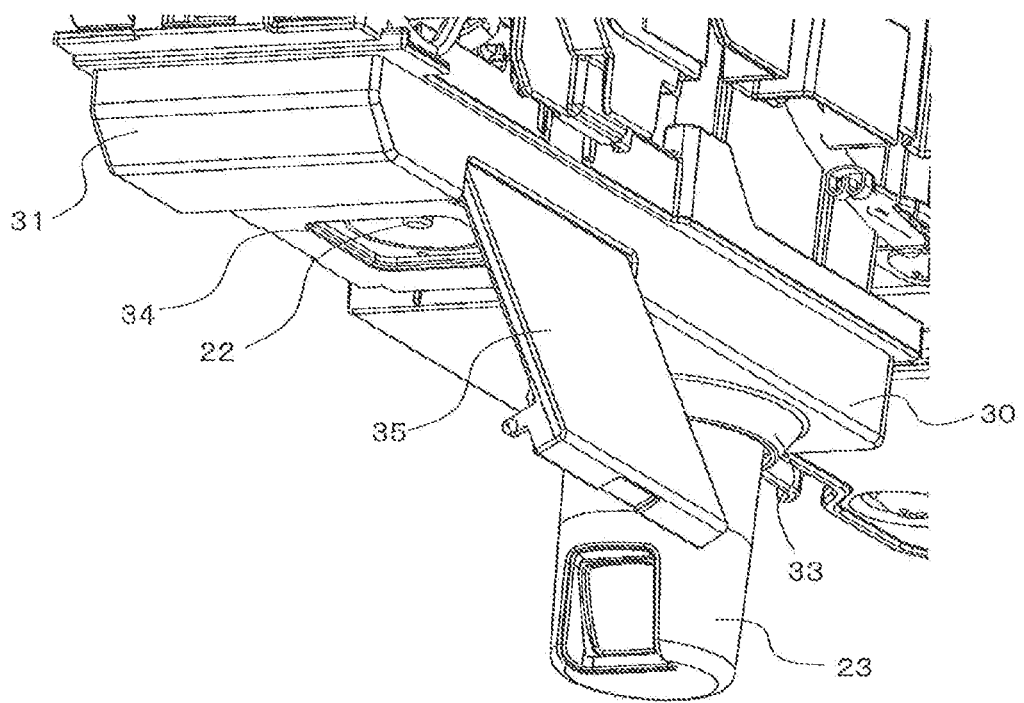
FIG. 7 is an enlarged environmental external perspective view of the housing section of FIG. 2.

FIG. 4 is a perspective view of the housing section 20 of the indoor unit 100 of the air conditioning apparatus according to the embodiment of the present invention. FIG. 5 is a cross-sectional view taken along line A-A of FIG. 4. FIG. 6 is a perspective view of a housing cover 30 according to the embodiment of the present invention with an openable lid 35 removed, and FIG. 7 is an enlarged external perspective view of the housing section 20 of FIG. 2 and its surroundings.

A configuration of the housing section 20 according to the embodiment will now be described.

As shown in FIGS. 4 and 5, the housing section 20 is provided with a remote control receiving section 21 that receives an infrared signal from a remote control, a manual operation switch 22 for manually causing the indoor unit 100 to operate, and a temperature detection sensor 23 that contactlessly detects a surface temperature of an object in a room. The temperature detection sensor 23 detects the surface temperature of a body, for example, with an infrared sensor. However, a camera, or other sensor, may also be used for the temperature detection sensor 22.

The housing section 20 is also provided with the housing cover 30 for housing the remote control receiving section 21, the manual operation switch 22, and all or a part of the temperature detection sensor 23.

In front of the housing cover 30, a light transmissive surface 31 is formed through which the infrared signal from the remote control passes. The light transmissive surface 31 is formed inclined at an angle from the front of the housing cover 30 to the back bottom side thereof, that is, it is inclined diagonally downward from the front of the indoor unit 100 and is made of a material that is transparent to the infrared signal.

The remote control receiving section 21 is arranged behind the light transmissive surface 31 to be opposed to and be parallel to the light transmissive surface 31. In other words, the light transmissive surface 31 is arranged in front of the remote control receiving section 21 to be opposed to and be parallel to the remote control receiving section 21 for reasons that will be described below.

A sensor opening port 32 is formed behind the light transmissive surface 31 and the temperature detection sensor 23 is moved in a top-bottom direction in and out of the sensor opening port 32. The sensor opening port 32 has on a periphery thereof a flange 33 extending downwardly. This flange 33 has a shape tapering from the top to the bottom and has a bottom diameter that is smaller than a top diameter.

It should be noted that the temperature detection sensor 23 may protrude downward from the sensor opening port 32 when in use and be housed inside the housing cover 30 when not in use, or may protrude downward from the sensor opening port 32 at all times. The flange 33 being formed on the periphery of the sensor opening port 32 obscures the protrusion of the temperature detection sensor 23, that is, this configuration provides improved design. In addition, the flange 33 having a shape tapering from the top to the bottom further obscures the protrusion of the temperature detection sensor 23 and provides improved design even more.

As shown in FIGS. 6 and 7, a switch opening port 34 is formed between the light transmissive surface 31 and the sensor opening port 32, and the manual operation switch 22 appears facing downward from the switch opening port 34. Also provided is the openable lid 35 that covers the manual operation switch 22. This openable lid 35 is provided on be openable and closable by moving in a left-right direction, and allows the manual operation switch 22 to be pressed when open and covers the manual operation switch 22 when closed. Thus, the manual operation switch 22 need not be a separate body at the bottom portion of the casing 6 and can be arranged as a part of the housing section 20 and can also hide the manual operation switch 22, thereby providing improved design. In addition, keeping the manual operation switch 22 hidden when not in use prevents operational errors. Furthermore, since the manual operation switch 22 appears facing downward when the openable lid 35 is open, the manual operation switch 22 can be pressed easily from a low position in the case in which the indoor unit 100 is installed in an elevated position.

It should be noted that the openable lid 35 may be openable and closable in a front-back direction. The positions of the sensor opening port 32 and the switch opening port 34 may be reversed in which case the positions of the manual operation switch 22 and the temperature detection sensor 23 should also be reversed. The sensor opening port 32 and the switch opening port 34 need not be formed directly behind the light transmissive surface 31 and may be formed side-by-side as long as they are formed behind the light transmissive surface 31.

Figure 8:
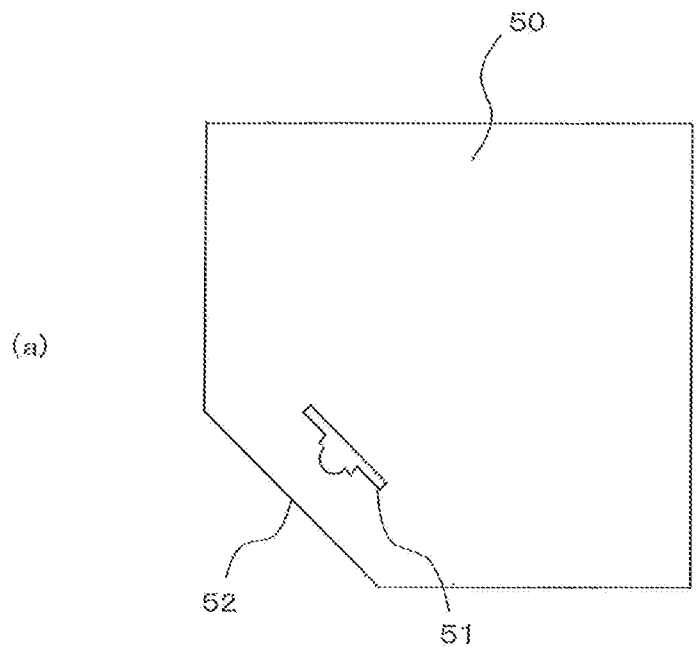
FIGS. 8(a) and 8(b) are side views exemplarily showing an indoor unit of a conventional air conditioning apparatus.
Figure 8:
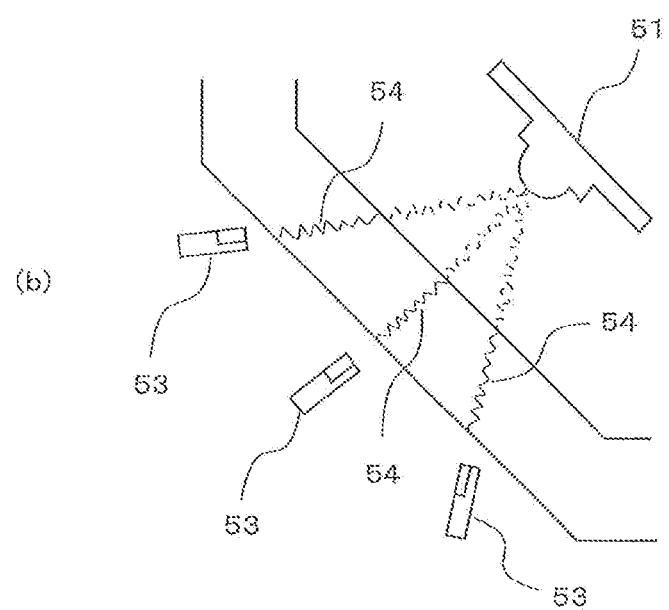

FIGS. 8(a) and 8(b) are side views exemplarily showing an indoor unit of a conventional air conditioning apparatus. FIG. 8(a) is a side view of the entire indoor unit and FIG. 8(b) is an enlarged side view of a remote control receiving section 51 of the indoor unit and its surroundings.

The remote control receiving section 51 of the conventional indoor unit shown in FIGS. 8(a) and 8(b) will now be described.

Conventionally, an infrared signal sent from a remote control 53 passes through a light transmissive surface 52 that is formed on a portion of a casing 50 and is received by the remote control receiving section 51 that is arranged behind the light transmissive surface 52.

When an infrared transmittance distance 54, which is the distance over which the infrared signal transmitted travels to pass through the light transmissive surface 52, is increased due to a direction of transmission of the remote control 53, it may be difficult for the infrared signal to reach the remote control receiving section 51, That is, receiver sensitivity of the remote control receiving section 51 may decrease and the remote control receiving section 51 may not receive the infrared signal.

The light transmissive surface 52 is thus inclined diagonally downward from the front and the remote control receiving section 51 is arranged behind the light transmissive surface 52 to be opposed to and be parallel to the light transmissive surface 31, that is, the remote control receiving section 51 is arranged to be opposed to diagonally downward toward the front. This prevents the infrared transmittance distance 54 from increasing even when the direction of transmission of the remote control 53 changes and suppresses reduction in the receiver sensitivity of the remote control receiving section 51 due to the direction of transmission of the remote control 53. Consequently, reception in a wide area is enabled, that is, the receiver sensitivity may be increased. The receiver sensitivity may be maximized by having the remote control receiving section 51 inclined at 45 degrees to the horizontal.

Figure 9:
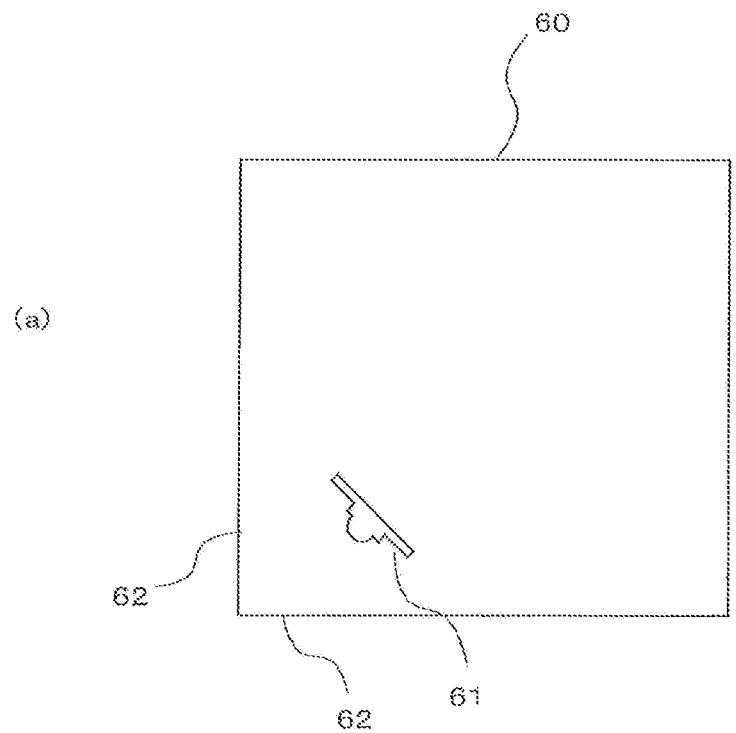
FIGS. 9(a) and 9(b) are side views exemplarily showing an indoor unit of a conventional air conditioning apparatus different from that of FIG. 8.
Figure 9:
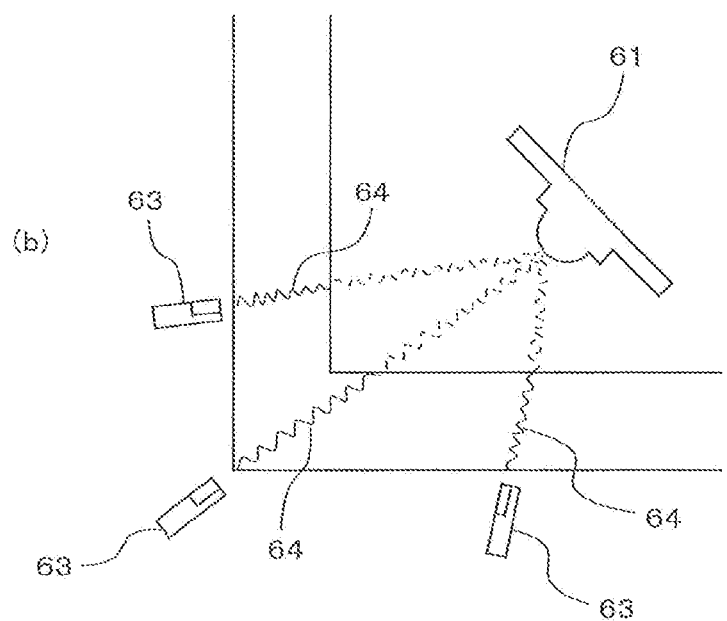

FIGS. 9(a) and 9(b) are side views exemplarily showing an indoor unit of a conventional air conditioning apparatus different from that of FIGS. 8(a) and 9(b). FIG. 9(a) is a side view of the entire indoor unit and FIG. 9(b) is an enlarged side view of a remote control receiving section 61 of the indoor unit and its surroundings.

The remote control receiving section 61 of the conventional indoor unit shown in FIGS. 9(a) and 9(b) will now be described.

In the case in which the indoor unit has a rectangular casing 60 for improved design, as shown in FIGS. 9(a) and 9(b), a light transmissive surface 62 is formed on front and bottom surfaces of the casing 60. Although the remote control receiving section 61 needs to be arranged inclined relative to the horizontal to increase receiver sensitivity, the remote control receiving section 61 here cannot be arranged to be opposed to and be parallel to the light transmissive surface 62. Thus, an infrared transmittance distance 64 may increase depending on a direction of transmission of a remote control 63, causing reduction in receiver sensitivity of the remote control receiving section 61 due to the direction of transmission of the remote control 63.

Figure 10:
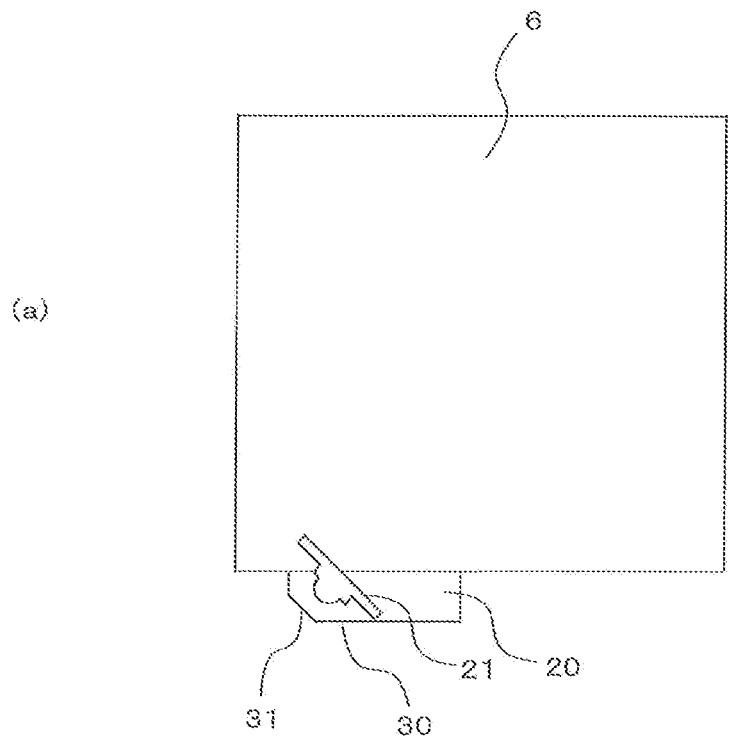
FIGS. 10(a) and 10(b) are side views exemplarily showing the indoor unit of the air conditioning apparatus according to the embodiment of the present invention.
Figure 10:
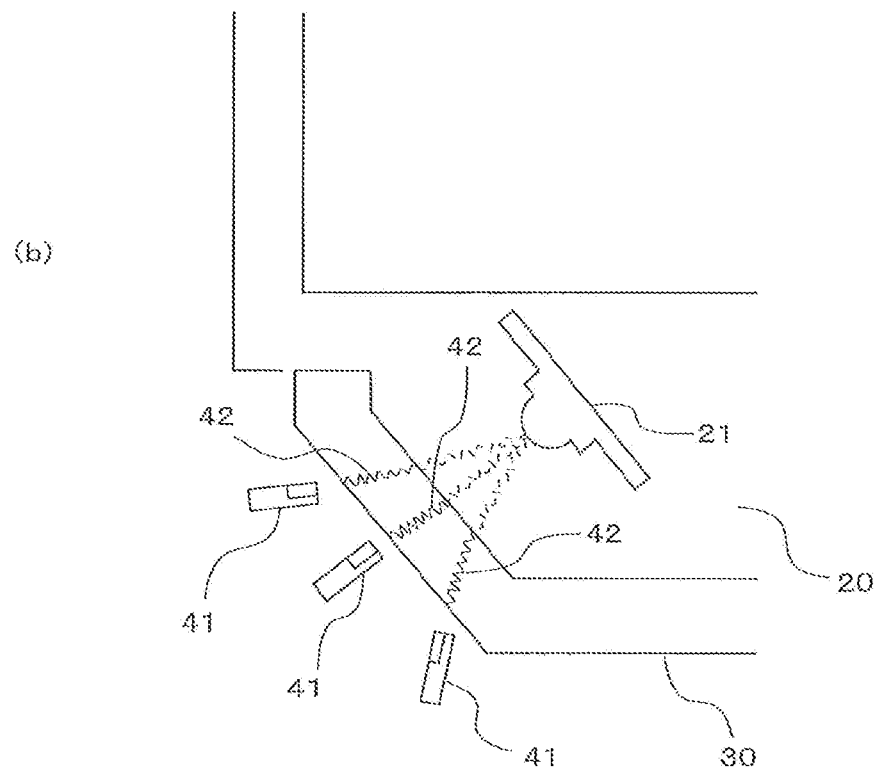

FIGS. 10(a) and 10(b) are side views exemplarily showing the indoor unit 100 of the air conditioning apparatus according to the embodiment of the present invention. FIG. 10(a) is a side view of the entire indoor unit 100 and FIG. 10(b) is an enlarged environmental view of the remote control receiving section of the indoor unit 100.

This embodiment, as shown in FIGS. 10(a) and 10(b), has the rectangular casing 6 provided on the front bottom portion thereof with the housing section 20 that includes, for example, the remote control receiving section 21. The housing section 20 is provided with the housing cover 30 that has the light transmissive surface 31 inclined diagonally downward from the front, the housing cover 30 housing, for example, the remote control receiving section 21. The remote control receiving section 21 is arranged to be opposed to and be parallel to the light transmissive surface 31.

Such a configuration prevents an infrared transmittance distance 42 from increasing even when a direction of transmission of a remote control 41 changes. Thus, even when the indoor unit 100 has the rectangular casing 6, this configuration can suppress reduction in the receiver sensitivity of the remote control receiving section 21 due to the direction of transmission of the remote control 41.

Figure 11:
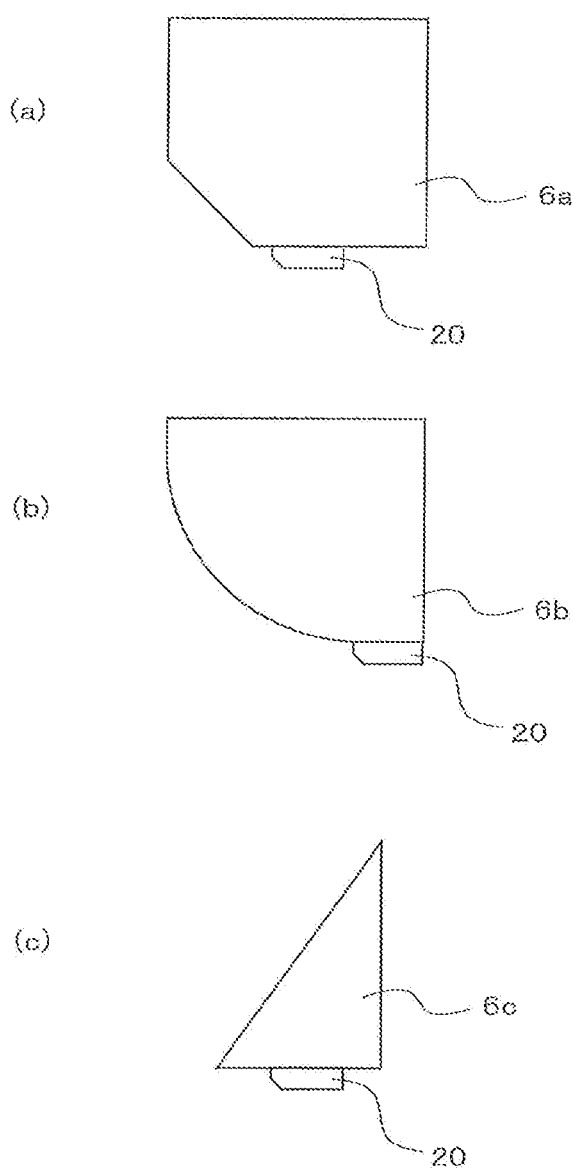
FIGS. 11(a), 11(b) and 11(c) are side views exemplarily showing casings of shapes different from that of the casing of the indoor unit of the air conditioning apparatus according to the embodiment of the present invention.

FIGS. 11(a), 11(b) and 11(c) are side views exemplarily showing casings of shapes different from that of the casing 6 of the indoor unit 100 of the air conditioning apparatus according to the embodiment of the present invention.

Although in the present embodiment, the housing section 20 is provided on the bottom portion of the rectangular casing 6, the housing section 20 can be provided on bottom portions such as of a casing 6a a portion of which is inclined diagonally downward shown in FIG. 11(a), a casing 6b a portion of which is rounded shown in FIG. 11(b), or a triangular casing 6c shown in FIG. 11(c) to obtain similar effects to those of the rectangular casing 6.

Figure 12:
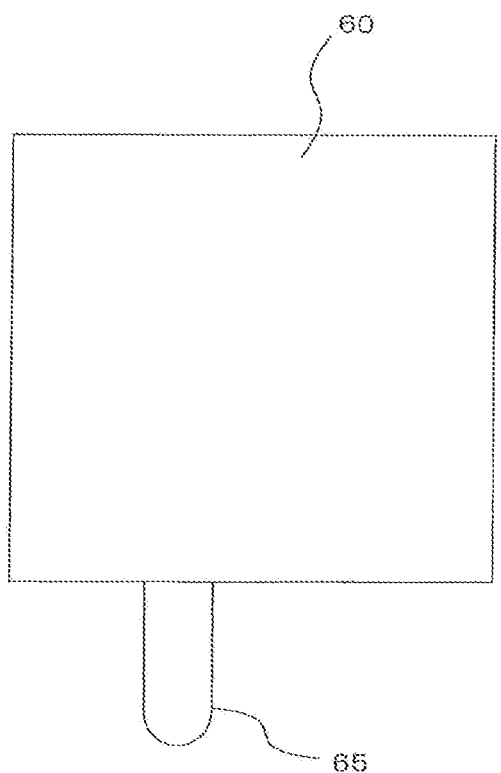
FIG. 12 is a side view exemplarily showing the indoor unit of the conventional air conditioning apparatus with a temperature detection sensor protruded therefrom.
Figure 13:
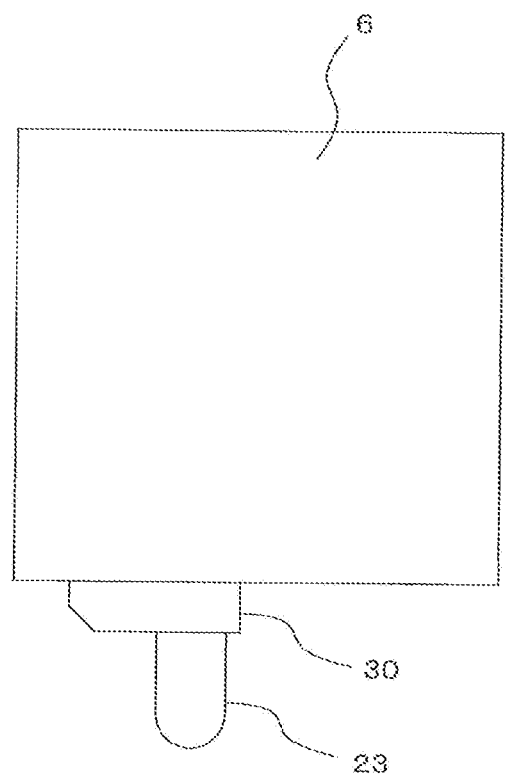
FIG. 13 is a side view exemplarily showing the indoor unit of the air conditioning apparatus according to the embodiment of the present invention with a temperature detection sensor protruded therefrom.

FIG. 12 is a side view exemplarily showing the indoor unit of the conventional air conditioning apparatus with a temperature detection sensor 65 protruded therefrom, and FIG. 13 is a side view exemplarily showing the indoor unit 100 of the air conditioning apparatus according to the embodiment of the present invention with the temperature detection sensor 23 protruded therefrom.

As shown in FIG. 12, in the conventional case where a housing cover is not provided on the bottom portion of the casing 60, protrusion of the temperature detection sensor 65 is noticeable when the temperature detection sensor 65 is protruded downward from the casing 60. This configuration impairs design.

By contrast, as shown in FIG. 13, in the case in which the housing cover 30 is provided on the bottom portion of the casing 6 as in the embodiment, the temperature detection sensor 23 protrudes downward from the sensor opening port 32 of the housing cover 30. As a result, a portion of the temperature detection sensor 23 is hidden by the housing cover 30 when the temperature detection sensor 23 protrudes downward from the casing 6 so that the temperature detection sensor 23 looks shorter, that is, the amount of protrusion of the temperature detection sensor 23 is reduced, obscuring the protrusion and thus providing improved design.

The invention claimed is:

1. A housing cover that is provided on, and that substantially covers, a housing section of an indoor unit of an air conditioning apparatus, wherein the housing section:
is provided on a bottom portion of a casing, which is rectangular in shape when viewed from a side, of the indoor unit;
includes a remote control receiving section configured to receive an infrared signal from a remote control and a temperature detection sensor configured to contactlessly detect a surface temperature of an object in a room; and
protrudes downward from the bottom portion of the casing,
the housing cover comprising:
a light transmissive surface inclined diagonally downward from a front; and
a sensor opening port formed behind the light transmissive surface, wherein:
the light transmissive surface is formed in front of the remote control receiving section to be opposed to and be parallel to the remote control receiving section, and
the temperature detection sensor protrudes from the sensor opening port.

2. The housing cover of claim 1, wherein
a flange, which has a shape tapering from the top to the bottom and has a bottom diameter that is smaller than a top diameter, is formed on a periphery of the sensor opening port.

3. The housing cover of claim 1, wherein:
the housing section has a manual operation switch for manually causing the air-conditioning apparatus to operate,
the housing cover comprises a switch opening port formed behind the light transmissive surface; and
the manual operation switch faces downward from the switch opening port.

4. The housing cover of claim 3 provided with
an openable lid openably and closeably covering the manual operation switch.

5. An indoor unit of an air conditioning apparatus, the indoor unit comprising:
a casing having a rectangular shape in a side view;
a housing section provided on the bottom portion of the casing and including:
a remote control receiving section for receiving an infrared signal from a remote control, and
a temperature detection sensor configured to contactlessly detect a surface temperature of an object in a room; and
a housing cover provided on the housing section, protruding downward from the bottom portion of the casing, the housing cover comprising:
a light transmissive surface inclined diagonally downward from a front, and
a sensor opening port formed behind the light transmissive surface, wherein:
the light transmissive surface is formed in front of the remote control receiving section to be opposed to and be parallel to the remote control receiving section, and
the temperature detection sensor protrudes from the sensor opening port.

6. The indoor unit of the air conditioning apparatus of claim 5, wherein:
the housing section has a manual operation switch for manually causing the air-conditioning apparatus to operate;
the housing cover comprises a switch opening port formed behind the light transmissive surface; and
the manual operation switch faces downward from the switch opening port.

* * * * *